March 3, 1964 H. T. HEATWOLE 3,122,996

INFORMATION STORAGE SYSTEM

Filed Dec. 9, 1959 4 Sheets-Sheet 1

INVENTOR
Henry T Heatwole by Wynne & Finken

ATTORNEYS

INVENTOR
Henry T Heatwole by Wynne & Finken

ATTORNEYS

INVENTOR
Henry T Heatwole
by Wynne & Fienken
ATTORNEYS

INVENTOR
Henry T Heatwole
by Wynne & Finken
ATTORNEYS 3,122,996
INFORMATION STORAGE SYSTEM Henry T. Heatwole, Silver Spring, Md., assignor to Heatwole Associates Incorporated, Washington, D.C., a corporation of the District of Columbia
Filed Dec. 9, 1959, Ser. No. 858,522
22 Claims. (Cl. 101—93)

This invention relates to systems, in which stored information is searched and retrieved by electronic means.

The development of high-speed data processing systems has made possible the application of electronic techniques to the problem of storage, selection and correlation of information. Most prior art storage systems have utilized magnetic tapes or drums as the storage medium. While such systems have been found very useful, they possess several limitations and disadvantages, including those arising from the necessity of movement of the magnetic tape or drum. Another limitation of magnetic storage systems is that while they are readily workable with binary coding systems, they require extensive and costly modification to be adapted to other numerical systems, such as the decimal system.

Accordingly, it is among the objects of the present invention to provide an information storage system which permits extremely rapid access to and retrieval of the stored information without the use of any moving parts except in the printer which reproduces the desired information.

Another object of the invention is to provide an information storage system which is readily adaptable to any numerical or digital system, including the binary system, the decimal system or other code systems.

A further object of the invention is the provision of an information storage system which may be searched for a specific subject or class information, generic classes of information, multiple subjects or for correlated subject matter.

Another object of the invention is to provide an information storage system which is rugged and durable and yet is inexpensive to manufacture and simple to operate.

Other objects of the invention include the provision of information storage units or memory cards which can be mass-produced by known printed circuit techniques and which may be easily coded.

Further objects and advantages of the invention will be apparent to those skilled in the art.

Broadly, the system of the invention comprises a stack of memory cards and associated electronic apparatus for scanning the stack of cards for retrieving the desired information. Each memory card carries a printed resistive circuit and contact means for said circuit in predetermined positions corresponding to coded information. Preferably, each memory card has a plurality of contacts coded to represent a particular entry or document, and a plurality of contacts coded to represent a subject associated with said particular entry or document. Each different entry or document is of course associated with a different coded set of contacts and each different subject will have a different coded set of contacts. A plurality of the coded memory cards are placed together in a stack, electrically insulated from each other, and a plurality of bus wires, corresponding to all of the coded contacts existing in the stack of cards, are connected to the contacts.

Electrical pulses of short duration are sequentially applied to the bus wires connected to the contacts corresponding to the entry or document code. The subject to be searched for is set on switches coded for the subjects, which switches are connected to the bus wires corresponding to the subjects. When the pulse corresponding to an entry number is applied to a card having the coded subject being searched for thereon, an electric voltage of a certain magnitude is developed at a certain point in the resistive circuit of said card, which voltage is detected, and by a suitable read out mechanism, the entry or document code on said card is printed out. Thus the system prints the code of the document or entry which includes the subject information desired.

The invention thus encompasses the uncoded memory card per se, the coded memory card per se, a stack of coded memory cards and the combination therewith of the electronic apparatus for producing the sequential entry pulses, for setting the desired subject code, and for detecting an output from any card. The invention also encompasses the method of coding a card, and systems for performing generic and correlation searches.

The coded memory card of the invention comprises generally a sheet of insulating material having a first conductive contact corresponding to first coded information, a second conductive contact corresponding to second coded information, a third conductive contact, electrically conducting means connecting said first contact to said third contact and electrically conducting means connecting said second contact to said third contact. In a particular embodiment for use with a decimal system code ranging from 0000 through 9999, the memory card comprises a sheet of insulating material having four first conductive contacts at a predetermined position on said sheet, said four first contacts corresponding to the units, tens, hundreds and thousands digits of a four digit subject number, four second conductive contacts at a predetermined position on said sheet, said four second contacts corresponding to the units, tens, hundreds and thousands digits of a four digit entry number, a third conductive contact on said sheet, electrically conducting impedance means connecting each of said four first contacts to said third contact, and electrically conducting impedance means connecting each of said four second contacts to said third contact.

The storage system comprises a stack of such cards electrically insulated from each other, a first set of busses contacting corresponding first contacts on said cards, a second set of busses contacting corresponding second contacts on said cards, and means contacting each of said third contacts for detecting an electric voltage of a certain magnitude on said third contact. The system furthere comprises, in combination with said stack of cards, means for generating electrical impulses, means for switching said pulses sequentially through the second set of busses, and setting switch means for contacting one of said first busses corresponding to desired subject information. The system also includes printing means for printing out the entry information coded on each sheet having the desired subject information code.

The uncoded memory card comprises generally a sheet of insulating material having a plurality of first conductive contacts at predetermined positions on said sheet corresponding to coded information, a plurality of second conductive contacts at predetermined positions on said sheet corresponding to second information, a third conductive contact on said sheet, electrically conducting means connecting said first contacts to said third contact and electrically conducting means connecting said second contacts to said third contact. In a preferred embodiment, the contacts are positioned along the edge or edges of said sheet. In an embodiment for coding in the decimal system from 0000 through 9999, the uncoded memory card comprises such a sheet wherein the plurality of first contacts consist of four groups of ten contacts corresponding to the units, tens, hundreds and thousands of a four digit subject number and said plurality of second contacts consist of four groups of ten contacts corresponding to the units, tens, hundreds and thousands of a four digit entry number.

The construction and operation of the system of the invention will be readily understood from the drawings and the following detailed description. While the invention may utilize any of a number of code systems, it is described in terms of the familiar decimal system encompassing numbers from 0000 through 9999, which is a preferred embodiment.

Figure 1:
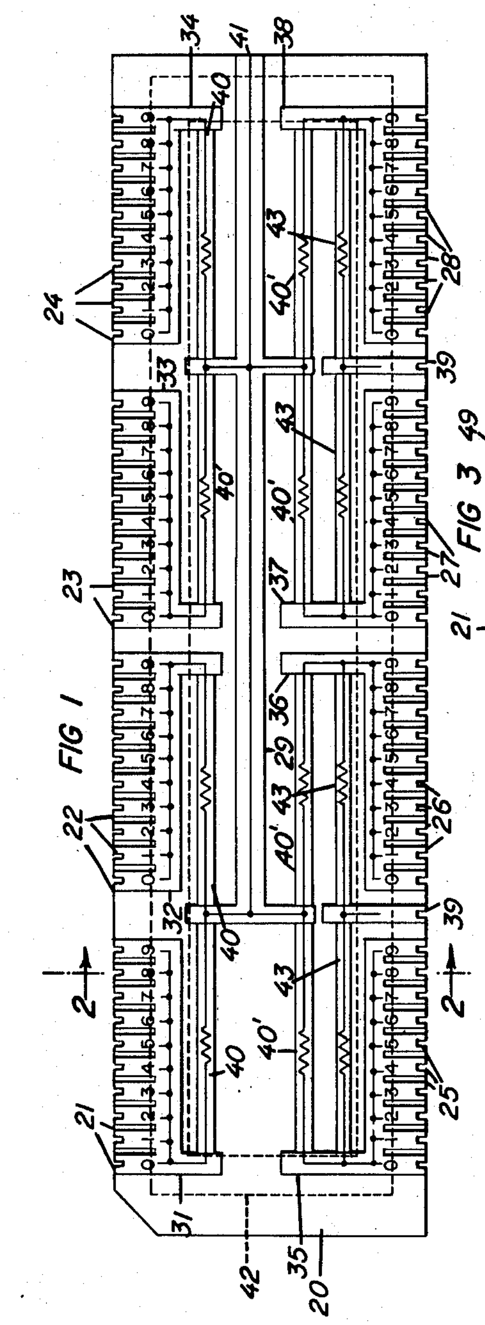
FIG. 1 is a plan view of an uncoded memory card of the invention.
Figure 2:
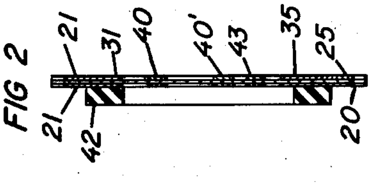
FIG. 2 is a cross section taken on line 2—2 of FIG. 1.

Referring to FIGS. 1 and 2, each memory card 20 is a sheet of insulating material, such as a phenolic resin impregnated sheet, carrying a plurality of low resistance conductive portions and resistors. The conductive portions may be silver or copper and may be produced by well known techniques such as by printing, plating or etching away selected areas from a sheet of foil laminated to the insulating sheet. Likewise the resistor portions may be placed on the card by well known techniques. The card 20 is provided with a plurality of conductive portions 31, 32, 33, 34, 35, 36, 37 and 38. Each of said conductive portions 31–38 terminate in a plurality of conductive tabs 21–28, respectively along the edges of the card 20. Conductive portions 31–34 are electrically connected to resistors 40 printed on the card, which in turn are connected to conductor 29 which terminates at output tab 41 at the right hand edge of the card. Conductors 35–38 are connected to resistors 40′ which in turn are also connected to conductor 29. Conductors 35–38 are also connected to resistors 43 which in turn are connected to conductive bias tabs 39 terminating at the bottom edge of the card.

It will be noted that each conductor 31–38 terminates in ten tabs 21–28, respectively, and that the tabs are numbered (for convenience in coding) with the digits 0–9. In coding, all but one of the tabs in each group of ten are removed. Thus any four digit number from 0000 through 9999 may be coded on the top edge and the bottom edge of the card. For example, for the number 4720, all but the No. 4 tab is removed from the tabs 21, all but the 7 tab is removed from the tabs 22, etc.

Each memory card has the same circuit on the reverse side of the card (not shown) with the exception that the tabs are numbered from 0–9 running from right to left on the reverse side. Each card 20 therefore carries two separate circuits insulated from each other. A spacing insulator 42 (shown in exaggerated form in FIG. 2) is provided on one side of each card so that when the cards are stacked together they are electrically insulated from each other. The position of the spacer 42 is shown in dotted lines in FIG. 1.

Figure 7:
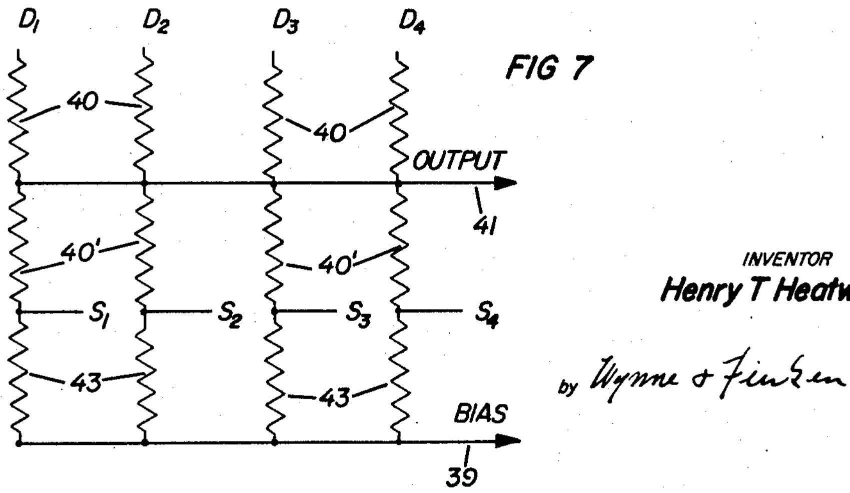
FIG. 7 is a circuit diagram of the memory card of FIG. 1.

For convenience, the circuit diagram of each card, comprising conductors and resistors, is shown in FIG. 1. The equivalent circuit is shown in FIG. 7, the contacts $D_1$ $D_2$, $D_3$, $D_4$, $S_1$, $S_2$, $S_3$ and $S_4$ corresponding to the eight coded contacts on the card.

Figure 3:
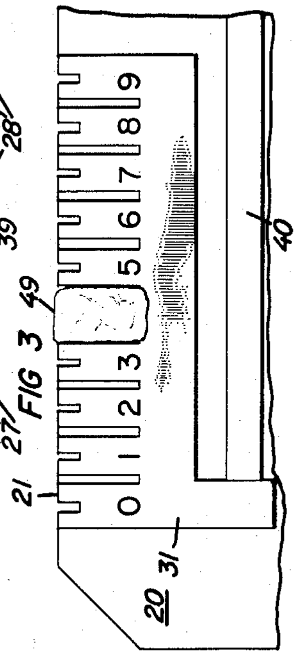
FIG. 3 is an enlarged view of a portion of the memory card showing a step in the coding thereof.
Figure 4:
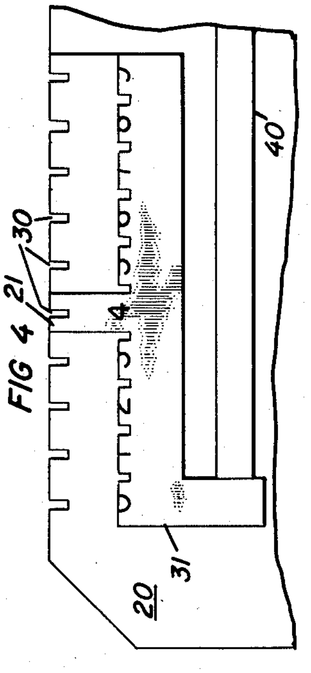
FIG. 4 is an enlarged view of a portion of a memory card coded according to FIG. 3.

In order to code the card, a resist 49 is applied over each contact corresponding to the desired digit as shown in FIG. 3 and the edge of the card is dipped in an acid or other etching solution. All the undesired tabs are thus removed, leaving the coded tab. The resist is then removed, leaving the coded tabs extending to the edge of the card, as shown in FIG. 4. The resist and etching technique is well known in other applications, hence it is unnecessary to discuss it in detail. When coding the bottom edge of the card by etching, bias tabs 39 must be covered with resist so that they are not etched off. In the card shown in FIG. 1, two bias tabs 39 are shown for convenience in layout.

Each card also has a corner removed as shown in FIG. 1 to enable proper orientation of the cards in a stack.

As is apparent from FIGS. 1, 3 and 4, the card and the tabs corresponding to each digit have a slit 30 therein. The purpose of the slits 30 is to position bus wires along the edges of the cards when they are assembled into a stack, as will be further described.

A suitable output detecting device, to be further described, is then soldered to the output tab 41 of each printed circuit.

A plurality of the coded cards are clamped together in properly oriented relationship and conductive bus wires are inserted into every row of slits 30 along the edges of the stack, including the row of slits of the bias tabs 39. The stack is then edged dipped in molten solder whereby electrically conducting contact is made between the buses and the conducting tabs.

On the card shown in FIG. 1, the tabs 21–24 along the upper edge correspond to the thousands, hundreds tens and units of the entry or document number and the tabs 25–28 along the bottom edge correspond to the thousands, hundreds, tens and units of the subject number.

Figure 5:
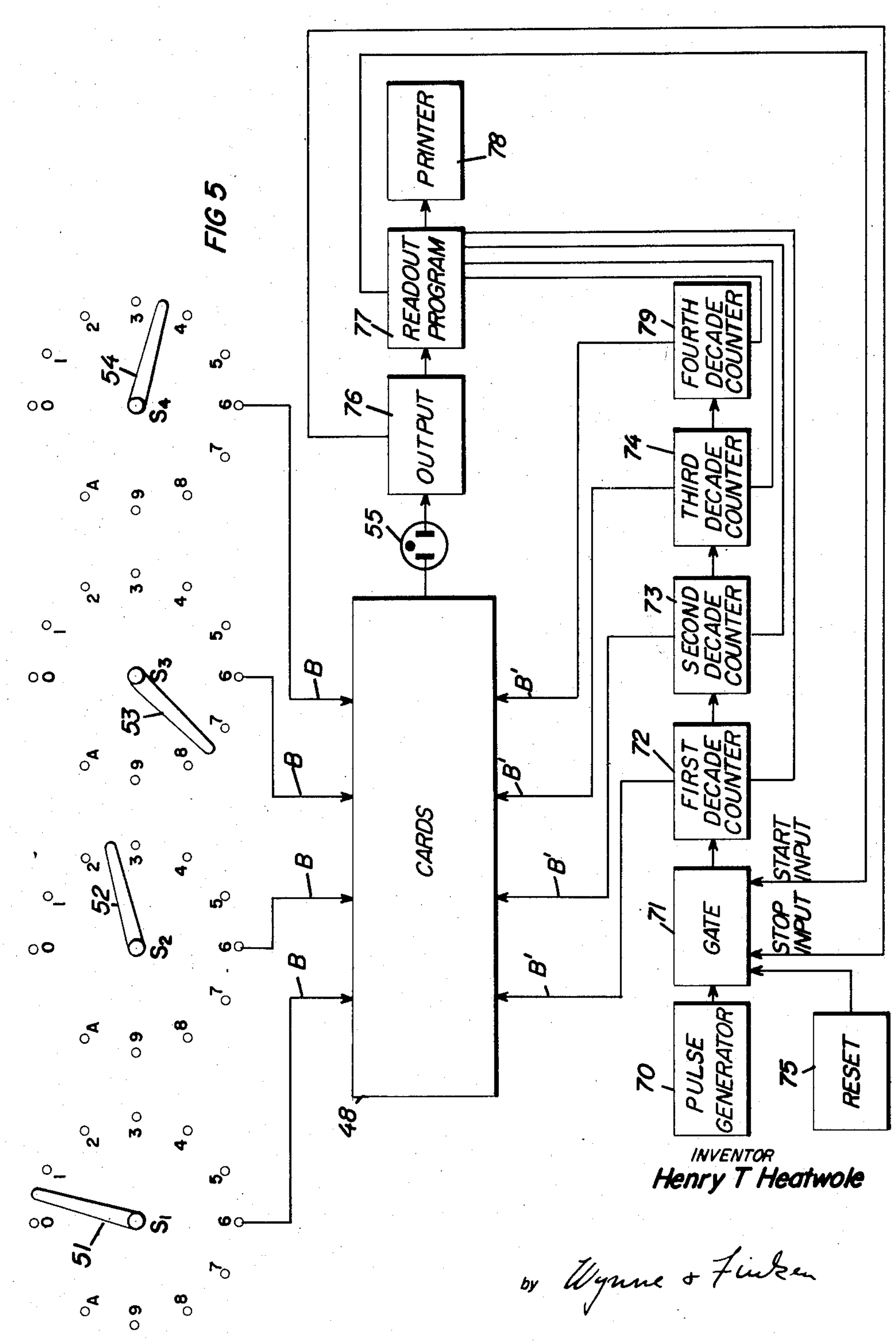
FIG. 5 is a block diagram of an embodiment of the information storage system of the invention for making single subject searches.

Referring now to FIG. 5, a stack 48 of the cards thus assembled is connected to the searching apparatus. Four rotary switches $S_1$, $S_2$, $S_3$, and $S_4$ each have contacts reading 0–9 and A. (A is for "Any," useful in a generic search which is further described herein.) The switches $S_1$ etc. are set to the number corresponding to the subject to be searched for. A positive voltage is impressed on each of the rotary contacts $S_1$, $S_2$, $S_3$ and $S_4$. The ten contacts 0–9 on each switch are connected to the respective ten bus wires in each decade running along the edge of the stack of cards 48 to contact the subject tabs 25–28 of the card of FIG. 1. (For clarity and convenience, only one bus wire B is shown for each decade in FIG. 5, but it is to be understood that ten buses correspond to each bus B.)

For scanning the cards, a four stage decade counter 72, 73, 74, 79 is used.

Figures 8, 9, 10, 11:
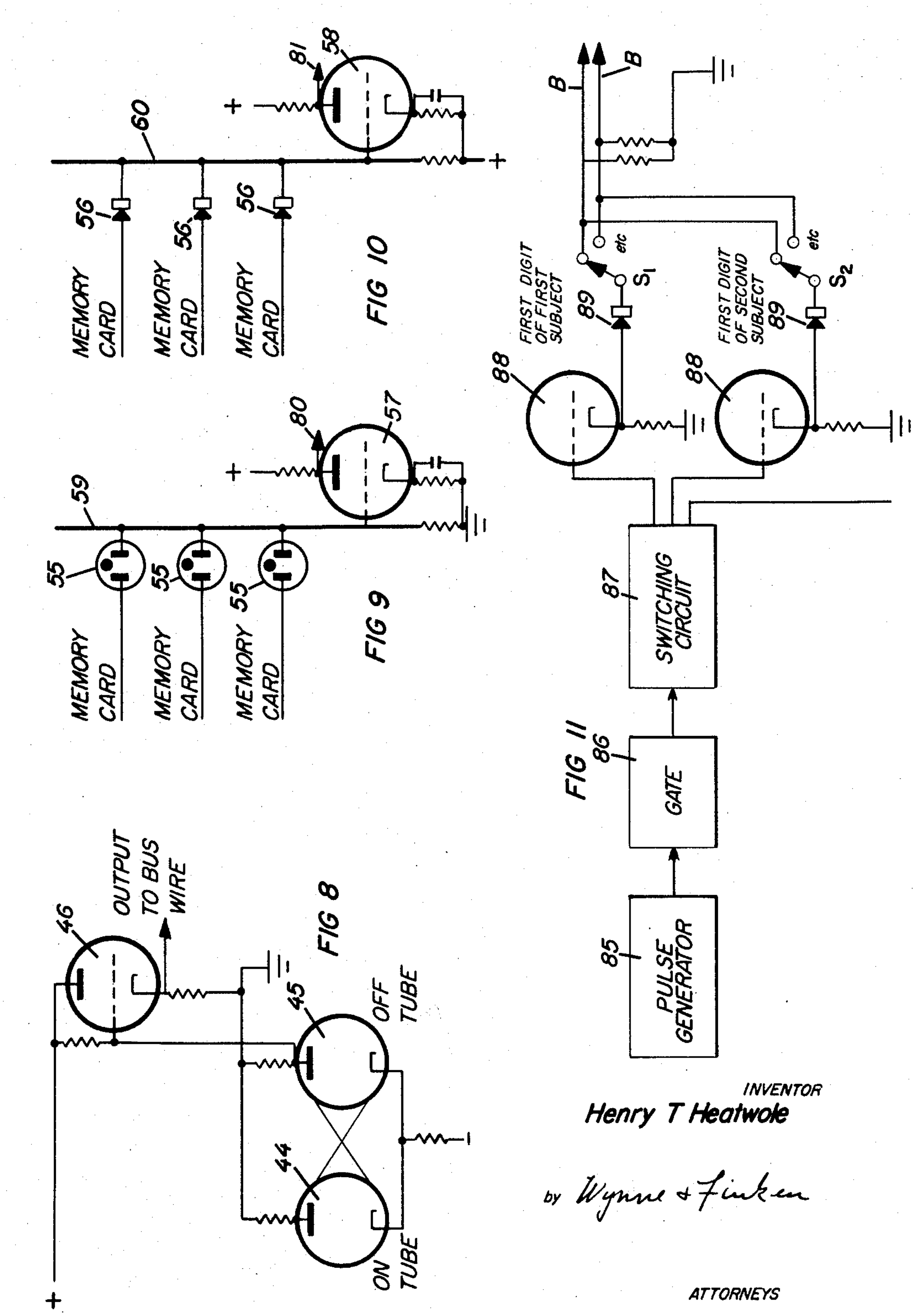
FIG. 8 is a circuit diagram of a portion of the counter used in the embodiments of FIGS. 1 and 6.
FIG. 9 is a circuit diagram of a portion of one embodiment of an output circuit utilizable in the systems of FIGS. 1 and 6.
FIG. 10 is a circuit diagram of a portion of another embodiment of an output circuit utilizable in the systems of FIGS. 1 and 6.
FIG. 11 is a block diagram of a switching circuit utilizable in the system of FIG. 6.

Each of the decade counters consists of ten flip-flops. The circuit for each flip-flop is represented in FIG. 8, consisting of a pair of diodes 44 and 45, the "off" diode of each pair controlling a cathode follower 46, the output of the latter connected to one of the buses B′ in contact with the entry number tabs 24, 23, 22 and 21 of the card of FIG. 1. The flip-flops are so designed that the "On" tube of only one of these will be conducting at any given instant. As "count" impulses are received, the position of the "On" tube advances down the line, and returns to the original, or zero, position after ten count impulses have been received. The first decade counter 72, representing the least-significant or units digit of the entry number, receives count impulses from a free-running pulse generator 70 through a gating circuit 71. The second decade counter 73 receives a count impulse each time the first decade returns to zero, and so on through third and fourth decade counters 74 and 79. For clarity and convenience, only one bus B′ is shown in each decade in FIG. 5, but is to be understood that ten buses correspond to each bus B′, and that each is controlled by a flip-flop feeding through a cathode follower as in FIG. 8. When the decade counter reaches a digit representing a given bus wire, the bus will then be subject to a positive voltage. A negative bias is applied to the busses associated with the bias tabs 39 from a separate power supply, not shown, the positive terminal of which is grounded. Thus a given card will receive eight separate positive inputs if and only if the four-digit subject number set by the operator is the same as the four-digit subject number for which the card has been coded, and the instantaneous count represented by the decade counters is the same as the four-digit entry or document number for which the card is coded. As will be shown, the output circuit of each card is designed to act only when eight positive inputs are present, but not to act if seven or fewer inputs are present.

Assume now that a sub-collection of 9999 entry numbers is to be searched for a given four-digit subject, which the operator has set on the four rotary switches. The counter is set to 0000 by pressing a Reset button 75. Upon starting, the operator opens the gating circuit 71 which permits count pulses to enter the first decade counter. If none of the entries satisfies the search condition, the counter will quickly count from zero to 9999. When, on the next count pulse, the fourth decade returns to zero, it produces a signal that closes the gate and stops the counter. The search is then complete.

When, during a search, the counter reaches the entry number of a card that satisfies the search conditions, that card will receive eight positive inputs. Its output circuit will act to trigger the main output circuit 76, which will do two things. First, it will emit a signal that closes the gate 71 and stops the counter. Second, it will initiate a program circuit 77 that enables a printing device 78 to "read" and print out the number at which the counter has been stopped. When the printing action has been completed, the program circuit reopens the gate, and the count is resumed.

Decade counters have been designed for more than a million counts per second. The maximum practicable searching speed, however, depends on the nature of the output device associated wtih each card. The searching speed of the system of FIG. 5 ranges from a minimum of about 2,000 entry numbers per second, using output devices costing a few cents per card, to 100,000 or more entry numbers per second if more expensive output devices are used.

The printed resistors on each memory card form an adding circuit, so that the voltage appearing on the output tab 41 depends on the number of positive inputs received by the card. Resistance and voltage values will depend on the output device, and on other circuit variables.

In the system shown in FIG. 5, the output tab 41 of each card is connected to a neon lamp 55. FIG. 9 illustrates a plurality of memory cards connected through a plurality of neon lamps 55 to an output bus 59 controlling an amplifier 57, the output 80 of which is passed through a diode rectifier for triggering the output circuit 76. In practice from about 10 to 100 memory cards and neon tubes, depending on the circuit constants, are associated with each amplifier 57 as shown in FIG. 9 which feeds to the output circuit 76. An alternative is to connect a number of parallel groups of 10 to 100 cards to a single amplifier through diodes.

Utilizing inexpensive neon lamps as detectors, the ionization speed of such lamps is such that search speeds of about 2000 entries per second are attainable.

As an example of the operation of the system, reference is made to FIG. 7. In one embodiment, resistors 40 and 43 on the memory card have a value of 10 megohms. Resistors 40′ have a value of 20 megohms. Input pulses of +100 volts are applied to the buses $D_1$–$D_4$. A positive voltage of 100 volts is applied through switches $S_1$–$S_4$. A negative bias of 200 volts is applied at tab 39. The neon lamps 55 are designed to ionize at 90 volts. Thus when the subject numbers set on the switches $S_1$–$S_4$ correspond to the subject numbers coded on the card and the decade counter reaches the entry number of that card, the voltage at the output 41 is 100 volts, ionizing the lamp. If seven or fewer of the inputs are present, i.e. the search conditions are not met, the highest voltage possible at output 41 is 83⅓ volts, which is insufficient to cause ionization of the lamp.

An alternative form of output detector may be a semiconductor diode 56 as shown in FIG. 10. A plurality (about 10 to 100, depending on circuit constants) of such diodes, each connected to a memory card, are connected to a bus 60 to which a positive bias is applied, and which is connected to an amplifier 58 having an output 81 analogous to that of the neon lamp output of FIG. 9. Using the example given above, a backward bias of 90 volts on the bus 60 will mean that a given diode will conduct only when all eight of the positive inputs are supplied to the memory card. The use of silicon diodes enables much higher searching speeds, up to 100,000 or more entries per second.

An advantage of the use of silicon diodes or the like is that their small size enables them to be permanently attached to the cards, as by positioning them in holes in the card. In such case the output tab 41 is connected directly to the amplifier bus 60, since the diodes 56 are mounted on the cards.

Another advantage of the invention is that a high speed printer 78 is unnecessary for many applications. Since the counter stops instantly when the search condition is met, an inexpensive relatively slow printer can print out the entry or document number, and after printing, the counter resumes its high-speed scanning of the entries, as explained above. In practice, an ordinary electric typewriter, actuated by solenoids or a similar printing device is used.

Generic searching may be accomplished by the system of FIG. 5. "A" or "Any" contacts are provided on the rotary switches $S_1$–$S_4$, and when the selectors 51–54 contact the appropriate "Any" contact, a relay is actuated which short circuits all the buses 0–9 for that switch, directly connecting all of them of the positive source of power. In this case all of the memory cards in the stack will receive a positive input for that decade of the subject number, regardless of coding. For example, assume that the subject number set is 3–4–5–Any. The system will then print the entry number of any memory card classified under any one of ten subjects, from 3450 through 3459.

The foregoing description is based on a collection of 10,000 entries or documents to be searched. (Since each entry or document may have more than one subject associated therewith, such a collection may contain many more than 10,000 cards.) For larger collections, a fifth entry-number digit may be added to the memory card, and a fifth decade to the entry-number scanning counter. This however has three disadvantages: the size of the card is increased; the output voltage swing is decreased; power requirements for the input voltages are greatly increased. Accordingly, while such a system is operative, it is not preferred.

An alternative is to divide the collection into subcollections of 10,000 entry numbers each. After the first sub-collection has been searched, the main output circuit and the bus-wire inputs are relay-switched to the second sub-collection by a program circuit. The decade counter scans only the last four digits of the entry numbers. If a desired entry is found in the first sub-collection, the program circuit causes the digit "0" to be printed before the number represented by the decade counter. In searching the second sub-collection, the digit "1" is printed before reading the counter, etc.

The sub-collection system adds to the total searching time the time required for relay switching, but for a collection of 100,000 entry numbers the total added time is less than a second. The sub-collection system has the advantage that the collection can be expanded at will. For example, the basic searching mechanism can be contained in a single relay rack, with the memory cards for each sub-collection in a separate rack. A new rack could be added at any time, simply by plugging it into the preceding rack. Each rack includes relays with the 80-odd poles required for switching. Each pole receives an input on its transfer. The normally-open contact of each pole connects the input to the appropriate bus wire of the sub-collection; the normally-closed contact passes it on to the next rack.

The system of the invention may also be used for multiple subject searches. Because of the high searching speed of the system, it is feasible to make a separate search for each of the desired subjects.

The system of the invention is also applicable to multiple subject correlation searches, as for example, a search for entries containing both of two subjects, all of three subjects, one subject and either of two others, etc. A separate row of rotary subject switches is provided for each subject, with corresponding fixed contacts wired in parallel. The search conditions are specified on a correlation switch.

The system will begin a search for the first subject specified. During this time a positive voltage is applied to the rotary contacts of only the first subject switches, the rotary contacts of the other switches being open-circuited. When the counter reaches the number of an entry classified under the first subject, the counter will stop. The positive voltage is then electromechanically switched by relays to all the other rows of subject switches in succession. Conventional memory and logic circuits are employed to determine whether the subjects under which this entry is classified meet the specified correlation conditions. If so, the entry number will be printed before the count is resumed. If not, the count will be resumed without printing.

Figure 6:
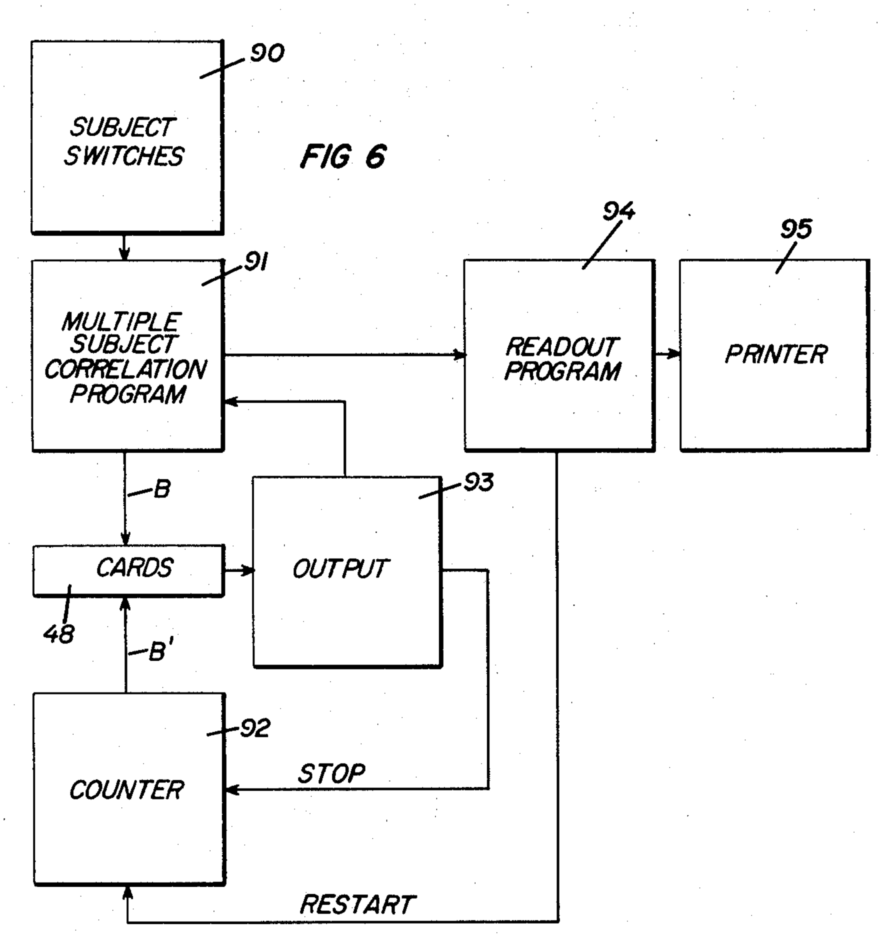
FIG. 6 is a block diagram of another embodiment of the invention for making multiple subject correlation searches.

FIG. 6 illustrates a multiple subject correlation search system. The multiple subject switches are shown at 90 and the search correlation program at 91. The stack of cards 48, counter 92, output 93, readout program 94 and printer 95 correspond to the same components respectively in the arrangement of FIG. 5.

The subjects can be switched electronically, rather than electromechanically, if the input voltage is supplied by cathode followers, rather than by direct connection to a power supply. FIG. 11 illustrates a portion of such a circuit utilizable in the arangement of FIG. 6. The subject switches are indicated at $S_1$, $S_2$, it being understood that additional switches are necessary, for example, 8 switches for a two subject-four digit search. Pulses are fed from generator 85 through gate 86 to switching circuit 87. The input voltage is supplied through cathode followers 88, through diodes 89 to the rotary contacts of the subject switches. The busses B feed to the stack of cards as previously described. With this system, the entry numbers are scanned electronically until the first subject is found; the entry-number counter is then stopped, and the remaining subjects scanned electronically. The associated memory and logic circuits are, of course, electronic.

Electronic subject scanning is more costly, but a great deal faster, than relay switching. It requires a modification of the memory card shown in FIGURE 2: The bias input tabs 39 and the four bias input resistors 43 are eliminated, with consequent saving. But the remaining resistors 40 and 40' must be formed to closer tolerances, because of the smaller swing between the output voltages produced by seven and eight inputs.

Thus there have been described novel information storage systems which have wide utility and versatility. The memory card or storage unit of the invention has been described in terms of a four digit decimal code, but it is apparent that any of a number of coding systems may be used in accordance with the principles of the invention. Many embodiments of the memory card are within the scope of the invention. For example, for simpler codes, all the contacts may be positioned along one edge of the card, or contact may be made within the body of the card, as by busses running through holes through the card. For simple codes, the bias inputs and associated bias resistors are also unnecessary. Likewise many techniques may be employed in fabricating and coding the memory cards. The resistors may be replaced by diodes. In similar manner, many modifications may be made in the detection circuitry and associated electronic equipment utilized in the systems described. Accordingly the embodiments described are illustrative only and the invention is intended to encompass all modifications and further embodiments that fall within the spirit and scope of the appended claims.

I claim:

1. An information storage unit comprising a sheet of insulating material having four first conductive contacts at a predetermined position on said sheet, said four first contacts corresponding to the units, tens, hundreds and thousand digits of a four digit subject number, four second conductive contacts at a predetermined position on said sheet, said four second contacts corresponding to the units, tens, hundreds and thousands digits of a four digit entry number, a third conductive contact on said sheet, electrically conducting impedance means connecting each of said four first contacts to said third contact, and electrically conducting impedance means connecting each of said four second contacts to said third contact, said electrical conducting impedance constituting an additive resistive circuit.

2. An information storage system comprising a stack of a plurality of insulating sheets, means for electrically insulating said sheets from each other, each said sheet having a first conductive contact at a predetermined position corresponding to first coded information, a second conductive contact at a predetermined position corresponding to second coded information, a third conductive contact, electrically conducting means connecting said first contact to said third contact, electrically conducting means connecting said second contact to said third contact, said electrically conducting means constituting an additive resistive circuit, a first set of busses contacting corresponding first contacts on said sheets, a second set of busses contacting corresponding second contacts on said sheets, and means contacting each said third contacts for detecting a potential occurring simultaneously at said first contact and second contact.

3. An information storage system as set forth in claim 2 wherein each sheet has four first contacts corresponding to the units, tens, hundreds and thousands of a four digit subject number, four second contacts corresponding to the units, tens, hundreds and thousands of a four digit entry number, and wherein said first set of busses consists of forty busses contacting corresponding first contacts on said sheets and said second set of busses consists of forty busses contacting corresponding second contacts on said sheets.

4. An information storage system as set forth in claim 2 including means for generating electrical pulses, means for sequentially switching said pulses through the second set of busses and switch means for contacting and supplying a potential to one of said first busses corresponding to a desired information bit.

5. An information storage system as set forth in claim 4 wherein said detecting means contacting each said third contact includes means for reading out the second information bit coded on a sheet having the desired first information bit.

6. An information storage system as set forth in claim 4 wherein said means for sequentially switching said pulses comprises a flip-flop counter.

7. An information storage system as set forth in claim 4 wherein said switch means for contacting one of said first busses comprises a switch having contacts corresponding to the number of different coded information bits appearing in said stack.

8. An information storage system as set forth in claim 2 wherein said means for detecting said potential comprises a neon lamp ionizing at a predetermined voltage.

9. An information storage system as set forth in claim 2 wherein said means for detecting said potential comprises a semiconductor diode.

10. An information storage system comprising a stack of a plurality of insulating sheets, means for electrically insulating said sheets from each other, each said sheet having a plurality of first conductive contacts at predetermined positions corresponding to a first coded information bit, a plurality of second conductive contacts at predetermined positions corresponding to a second coded information bit, a third conductive contact, electrically conducting means connecting said first contacts to said third contact, electrically conducting means connecting said second contacts to said third contact, said electrically conducting means constituting an additive resistive circuit, a first set of busses contacting corresponding first contacts on said sheet, a second set of busses contacting corresponding second contacts on said sheet, and means contacting each said third contact for detecting a potential occurring simultaneously at said first contact and second contact.

11. An information storage system as set forth in claim 10 including means for generating electrical pulses, means for sequentially switching said pulses through said second set of busses and a plurality of switches for contacting and supplying a potential to one each of said plurality of said first set of busses corresponding to a desired information bit.

12. An information storage system as set forth in claim 11 wherein said plurality of switches each have a plurality of contacts corresponding to the number of different coded information bits appearing in each of said plurality of information bits appearing in said stack.

13. An information storage system as set forth in claim 12 wherein each of said switches include means for shorting all of the said plurality of contacts whereby said information bits may be searched generically.

14. An information storage system as set forth in claim 12 wherein said means for sequentially switching said pulses includes counter means.

15. An information storage system as set forth in claim 14 including means responsive to said detecting means for stopping said counter means, and means for reading out the code number at which said counter is stopped.

16. An information storage system as set forth in claim 15 including means for restarting said counter means after said reading out means has read out said code number.

17. An information storage system comprising a stack of a plurality of memory cards, means for electrically insulating said cards from each other, each said card having first resistive circuit thereon and a plurality of first conductive contacts at predetermined positions corresponding to a coded subject number in contact with said first resistive circuit, a second resistive circuit thereon and a plurality of second conductive contacts at predetermined positions corresponding to a coded entry number in contact with said second resistive circuit and an output detecting means connected to both said first and second resistive circuits, a plurality of subject number busses in contact with said first contacts in said stack, and a plurality of entry number busses in contact with said second contacts in said stack.

18. An information storage system as set forth in claim 17 including means for applying a potential to selected ones of said subject number busses, and means for applying electrical pulses sequentially to said entry number busses, whereby the output detecting means on one of said cards in said stack is operative when the first resistive circuit on said card corresponds to said selected subject number and the second resistive circuit on said card corresponds to an electrical pulse in the sequence.

19. An information storage system as set forth in claim 18 wherein said means for applying a potential to selected ones of said subject number busses comprises switch means having contacts corresponding to the number of subject numbers in said stack of cards.

20. An information storage system as set forth in claim 19 including a plurality of said switch means, each corresponding to a subject number, means responsive to said output detecting means for transferring potential from one of said switch means to another of said switch means, correlation means responsive to said output detecting means on another of said cards in said stack, and means responsive to the correlation means for reading out the entry number of said cards having both said selected subject numbers coded thereon.

21. An information storage system comprising a plurality of stacks of memory cards as set forth in claim 17, means for electrically scanning the entry numbers of one of said stacks, and means operative to switch said scanning means to a second stack upon completion of scanning of said first stack.

22. An information storage unit comprising a sheet of insulating material having first conductive contacts comprising four groups of ten contacts each corresponding respectively to the units, tens, hundreds and thousands of a four digit subject number at predetermined positions on said sheet, second conductive contacts comprising four groups of ten contacts each corresponding respectively to the units, tens, hundreds and thousands of a four digit entry number at predetermined positions on said sheet, a third conductive contact on said sheet, electrically conducting means connecting said first contacts to said third contact and electrically conducting means connecting said second contacts to said third contact, said electrical conducting means constituting an additive resistive circuit.

References Cited in the file of this patent

UNITED STATES PATENTS

| | | |
|---|---|---|
| 1,957,193 | Armbruster | May 1, 1934 |
| 2,171,556 | Higginbottom | Sept. 5, 1939 |
| 2,353,001 | Armbruster | July 4, 1944 |
| 2,353,061 | Oldenboom | July 4, 1944 |
| 2,448,761 | Armbruster | Sept. 7, 1948 |
| 2,508,030 | Karns | May 16, 1950 |
| 2,702,380 | Brusterman | Feb. 15, 1955 |
| 2,718,356 | Burrell | Sept. 20, 1955 |
| 2,773,444 | Whitney | Dec. 11, 1956 |
| 2,796,830 | Hilton | June 25, 1957 |
| 2,888,336 | Padgett | May 26, 1959 |
| 2,898,521 | Creveling | Aug. 4, 1959 |
| 2,912,312 | Japel | Nov. 10, 1959 |
| 2,935,251 | Dickinson | May 3, 1960 |
| 2,955,236 | Luhn | Oct. 4, 1960 |
| 2,990,499 | Cordes | June 27, 1961 |